UNITED STATES PATENT OFFICE 2,628,979

PROCESS FOR THE PREPARATION OF UNSATURATED ALDEHYDES

Josef Ferdinand Arens and David Adriaan van Dorp, Oss, Netherlands, assignors to N. V. Organon, Oss, Netherlands, a corporation of the Netherlands No Drawing. Application December 9, 1947, Serial No. 790,725. In the Netherlands October 30, 1946

Section 1, Public Law 690, August 8, 1946
Patent expires October 30, 1966

6 Claims. (Cl. 260—598)

The invention relates to the preparation of certain unsaturated aldehydes. The starting materials are compounds of the type:

$$R_1R_2COH-CH=CHOR_3 \quad (I)$$

where $R_1$ means hydrogen or an organic group,
$R_2$ means an organic group,
$R_3$ means an alkyl, aryl or aralkyl group, wherein the group $=COH-CH=CHOR_3$ may have a double linkage to one and the same organic group so that $R_1$ and $R_2$ represent that same group.

According to the invention the compounds $R_1R_2COH-CH=CHOR_3$ are transformed into the said unsaturated aldehydes by splitting off a molecule of water and replacing the group $R_3$ by hydrogen:

$$R_1R_2COH-CH=CHOR_3 \longrightarrow R_1R_2C=CH-CHO + R_3OH \quad (II)$$

The starting materials (I) have up till now not been described in the literature. They may be prepared according to the following two methods, schematically indicated hereafter.

1.

2.
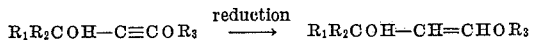

It must be taken into consideration that by $CH\equiv COR_3$ (Method 1) and by $CH_2=CHOR_3$ (Method 2) also organometallic compounds are meant, derived from the respective acetylene and ethylene compounds.

The process may be applied advantageously in the following cases, but is not restricted thereto.

I. $R_1$ and $R_2$ mean together the β-ionylidene group

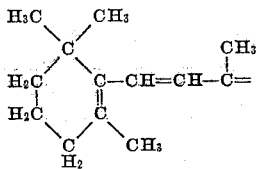

vide Example 1 and Example 2.

II. $R_1$ means the phenyl group $C_6H_5$ and $R_2$ means the methyl group $CH_3$, that is to say, starting from acetophenone β-methyl cynnamyl aldehyde is obtained (vide Example 3).

III. $R_1R_2C=O$ means the β-ionone. β-ionylidene acetaldehyde is then obtained, which is an important intermediate produce in the synthesis of the vitamin A (vide Example 4).

Example 1

11.8 g. of phenoxyacetylene are converted with an equivalent quantity of ethyl magnesium bromide, in ethereal solution in an atmosphere of nitrogen. To the solution of phenoxyacetylene magnesium bromide obtained an etheral solution of 26 g. of $C_{18}$-ketone (a well known ketone from the vitamin A series) is added dropwise at about —5° C. while stirring in an atmosphere of nitrogen and it is stirred for half an hour at room temperature. It is cooled again and decomposed with cold ammonium chloride solution.

The ether layer is separated, washed with ice-cold ammonium chloride solution, then with ice-cold 1 N soda lye, then with water until neutral and thereafter dried over sodium sulphate. The ether is distilled down in vacuo under nitrogen. From the tough oil obtained the almost pure phenoxyacetylenyl carbinol is obtained with the aid of chromatography (over an aluminum oxide standardized according to Brockmann) as a yellow oil. This is received in the ten-fold volume of ethyl acetate and hydrogenated catalytically with hydrogen under the influence of palladium-calcium carbonate of 0.3%. The calculated quantity of hydrogen is quickly consumed and the hydrogenation is stopped. After filtration it is concentrated in vacuo under nitrogen. The carbinol obtained, dissolved in an indifferent solvent is hydrolized by shaking with a saturated aqueous solution of oxalic acid for 48 hours. At the same time water is then split off. The vitamin A aldehyde obtained may be reduced to vitamin A in a known way.

Example 2

Into a three-necked flask provided with gas-inlet tube, cooler and stirrer 26 g. of $C_{18}$-ketone, 15 g. of $C_2H_5OCH=CHBr$, 2.4 g. of magnesium shavings and 50 cc. of absolute ether are put under nitrogen. By heating and addition of a grain of iodine the reaction is set going. After the magnesium is consumed boiling is continued for 10 minutes. The mixture is cooled and decomposed with ice and saturated ammonium chloride solution. The ether layer is washed with ammonium chloride solution, water, sodium carbonate solution and again with water. After drying over sodium sulphate and distilling down of the ether in vacuo, the oil is hydrolized in the way described in Example 1.

*Example 3*

In a three-necked flask of 500 cc. an ethyl magnesium bromide solution is prepared from 4.34 g. of magnesium, 19.5 g. of ethyl bromide and 100 cc. ether as a solvent. Within 30 minutes 12.5 g. of bromo ethoxy acetylene in 30 cc. ether are added dropwise while stirring and stirring is continued for half an hour whilst cooling in a mixture of ice and salt. Two layers are formed and ethane escapes.

Within an hour 21.5 g. of acetophenone in 50 cc. of dry ether are added dropwise whilst stirring thoroughly and stirring is continued for half an hour more. A white to greyish-brown porridge of crystals has arisen in the meantime. It is poured out into cold ammonium chloride solution of 10% and ice. After filtration separation of the ether layer, washing with water, ammonium chloride solution and again a few times with water it is dried over sodium sulphate. The ether is distilled down and the residue is fractionated in high vacuo. After a first running of acetophenone and some intermediate running the carbinol passes over as a colourless oil. Yield 16. boiling point 98–100° C. (0,1 mm.). After keeping at −80° C. the temperature is allowed to rise and at 0° C. the oil crystallizes. 16 g. of the carbinol are dissolved in 50 cc. of pure ethyl acetate (distilled over potassium carbonate) and hydrogenated with 500 mg. of palladium barium sulphate (0,3%; with a higher percentage proportionally less is needed) as a catalyst. After filtration the clear solution is distilled in vacuo. The ethylenic carbinol obtained passes over at 75–78° C. (0.1–0.01 mm). 1 g. of this carbinol is boiled for 15 minutes with 10 cc. of 0.1 N hydrochloric acid, cooled and neutralized. After shaking out with ether and distillation of the ether layer the β-methyl cinnamyl aldehyde is obtained as a residue. The semicarbazone melts at 205.5–206.5° C.

*Example 4*

In a three-necked flask of 500 cc. an ethyl magnesium bromide solution is prepared from 3.2 g. of magnesium, 14.3 g. of ethyl bromide and 50 cc. of ether as a solvent. While cooling in ice a solution of 94.4 g. of ethoxy acetylene in 20 cc. of ether is added dropwise and it is stirred for an hour. Within a quarter of an hour 20 g. of β-ionone, dissolved in 65 cc. of ether, are added to the solution obtained in an atmosphere of nitrogen while stirring and cooling in ice and salt. Stirring is continued for half an hour and the porridge that has been formed meanwhile is decomposed by pouring out into an ammonium chloride solution and ice.

After filtration the ether layer is separated, washed with 1 N ammonium chloride solution and a few times with water and dried over sodium sulphate. After inspissating in vacuo a reddish oil remains. The unchanged β-ionone is removed herefrom by chromatography over $Al_2O_3$ while petroleum ether is used as a solvent. The β-ionone fraction passes through most quickly, the impurities appear at the top of the column (brown band). All intermediate fractions are eluated with benzene plus 1% of alcohol, inspissated in vacuo, suffused with benzene a few times, again inspissated for the purpose of removing the alcohol and again chromatographied with benzene as a solvent over $Al_2O_3$ (standardized according to Brockmann). Thus the carbinol aimed at is obtained. This is hydrogenated with hydrogen under the influence of a palladium catalyst. The ethylenic carbinol obtained is dissolved in ether and shaken with saturated oxalic acid solution for 48 hours. The ether layer is separated, washed until neutral and the β-ionylidene acetaldehyde is purified by distillation in vacuo. If desired it may be purified again by a final chromatography.

We claim:

1. A process for the preparation of unsaturated aldehydes, characterized in that a compound of the formula

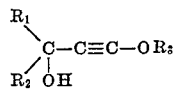

in which $R_1$ stands for a member selected from the class consisting of hydrogen, non-substituted and substituted hydrocarbon groups; $R_2$ stands for a member selected from the class consisting of non-substituted and substituted hydrocarbon groups; and $R_3$ stands for a member selected from the class consisting of alkyl, aryl and aralkyl groups is catalytically hydrogenated to produce a compound of the formula

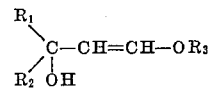

and the latter is then treated with an acidic reagent, by which an alcohol of the formula $R_3OH$ is split off and a molecular rearrangement takes place resulting in the formation of an unsaturated aldehyde of the formula

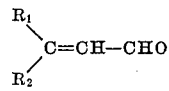

2. Process according to claim 1, characterized in that a compound of the formula

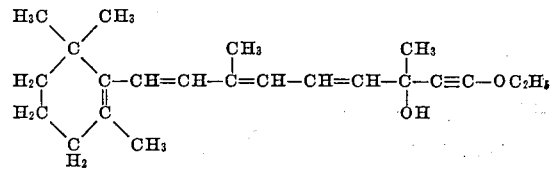

is catalytically hydrogenated, and the resulting product is treated with an acidic reagent by which vitamin A aldehyde is formed.

3. Process according to claim 1, characterized in that a compound of the formula

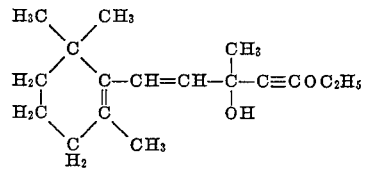

is catalytically hydrogenated, and the resulting product is treated with an acidic reagent by which β-ionylidene acetaldehyde is formed.

4. Compounds of the formula

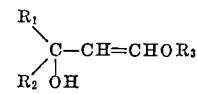

in which $R_1$ stands for a member selected from the class consisting of hydrogen, non-substituted and substituted hydrocarbon groups, $R_2$ stands for a member selected from the class consisting of non-substituted and substituted hydrocarbon groups, and $R_3$ stands for a member selected from the class consisting of alkyl, aryl and aralkyl groups.

5. A compound of the formula

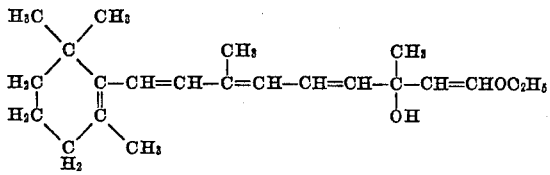

6. A compound of the formula

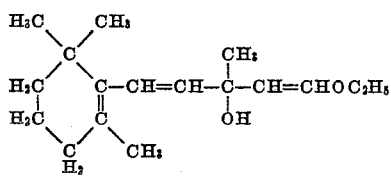

JOSEF FERDINAND ARENS.
DAVID ADRIAAN van DORP.

REFERENCES CITED

The following references are of record in the file of this patent:

UNITED STATES PATENTS

| Number | Name | Date |
|---|---|---|
| 2,280,236 | Inhoffen | Apr. 21, 1942 |

FOREIGN PATENTS

| Number | Country | Date |
|---|---|---|
| 347,399 | France | Mar. 6, 1905 |
| 4,174 | France | June 10, 1905 |
| | (Addition to No. 347,399) | |
| 62,738 | Netherlands | Mar. 15, 1949 |

OTHER REFERENCES

Thompson et al.: Jour. Am. Chem. Soc., vol. 63, Mar. 1941, pp. 752-55.

Isler et al.: Barell Festschrift, June 1946, pp. 33-44.

Heilbron et al.: Studies in the Polyene Series, part XXII, Jour. of the Chem. Soc., 1946, pp. 27-30.